(12) United States Patent
Weih

(10) Patent No.: US 11,186,222 B2
(45) Date of Patent: Nov. 30, 2021

(54) MOLDED PART FOR A VEHICLE INTERIOR AND METHOD FOR PRODUCING SUCH A MOULDED PART

(71) Applicant: NOVEM Car Interior Design GmbH, Vorbach (DE)

(72) Inventor: Philipp Weih, Bayreuth (DE)

(73) Assignee: NOVEM CAR INTERIOR DESIGN GMBH, Vorbach (DE)

( * ) Notice: Subject to any disclaimer, the term of this patent is extended or adjusted under 35 U.S.C. 154(b) by 0 days.

(21) Appl. No.: 16/650,585

(22) PCT Filed: Sep. 24, 2018

(86) PCT No.: PCT/EP2018/075806
§ 371 (c)(1),
(2) Date: Mar. 25, 2020

(87) PCT Pub. No.: WO2019/063483
PCT Pub. Date: Apr. 4, 2019

(65) Prior Publication Data
US 2020/0231090 A1 Jul. 23, 2020

(30) Foreign Application Priority Data
Sep. 27, 2017 (DE) ...................... 10 2017 122 429.7

(51) Int. Cl.
*B60Q 3/54* (2017.01)
*B60Q 3/64* (2017.01)
(Continued)

(52) U.S. Cl.
CPC ................ *B60Q 3/54* (2017.02); *B60Q 3/64* (2017.02); *B60R 13/02* (2013.01); *G02B 6/006* (2013.01);
(Continued)

(58) Field of Classification Search
CPC .... B60Q 3/54; B60Q 3/62; B60Q 3/64; B60R 13/02; G02B 6/0035; G02B 6/006
See application file for complete search history.

(56) References Cited

U.S. PATENT DOCUMENTS 2,886,911 A * 5/1959 Hardesty .................. H01H 9/18
40/546
6,416,844 B1 * 7/2002 Robson ................. B44C 5/0446
428/142
(Continued)

FOREIGN PATENT DOCUMENTS

DE 10313068 A1 12/2004
DE 102011082343 A1 3/2013
(Continued)

OTHER PUBLICATIONS

International Search Report dated Jan. 16, 2019 from International Patent Application No. PCT/EP2018/075806 filed Sep. 24, 2018.

*Primary Examiner* — William N Harris
(74) *Attorney, Agent, or Firm* — Workman Nydegger

(57) ABSTRACT

The invention relates to a trim part designed as a molded part for a vehicle interior, comprising a decorative layer and a carrier arranged on a reverse side thereof. The decorative layer comprises a decorative ply and a light-conducting optical layer with a first refractive index, wherein the optical layer is arranged on a front/visible side of the decorative layer, wherein at least one light source is provided on or in the molded part for illuminating the optical layer, wherein the light source is arranged such that light emanating from the light source is laterally into the optical layer. A light-conducting additional layer with a second refractive index is provided in the decorative layer between the decorative ply and the optical layer, adjoining the optical layer. The first
(Continued)

refractive index of the optical layer is greater than the second refractive index of the additional layer.

13 Claims, 1 Drawing Sheet

(51) Int. Cl.
    *F21V 8/00*         (2006.01)
    *B29C 45/14*       (2006.01)
    *B60R 13/02*       (2006.01)
    *B29L 31/30*       (2006.01)

(52) U.S. Cl.
    CPC ...... *G02B 6/0035* (2013.01); *B29C 45/14336* (2013.01); *B29L 2031/30* (2013.01); *B60Q 2500/10* (2013.01)

(56) References Cited

U.S. PATENT DOCUMENTS

| | | | |
|---|---|---|---|
| 10,059,259 B2 * | 8/2018 | Cannon | B60Q 3/20 |
| 10,821,889 B2 * | 11/2020 | DeGrote | B60Q 3/70 |
| 2012/0320615 A1 | 12/2012 | Englert | |
| 2013/0223087 A1 * | 8/2013 | Mueller | B60Q 3/745 362/511 |
| 2015/0274066 A1 * | 10/2015 | Del Pozo Gonzalez | B60Q 3/54 362/551 |
| 2015/0307033 A1 * | 10/2015 | Preisler | B60R 13/02 362/488 |
| 2017/0282789 A1 * | 10/2017 | Ohashi | B60Q 3/82 |
| 2018/0118101 A1 * | 5/2018 | Salter | B60Q 3/62 |
| 2019/0031090 A1 * | 1/2019 | Stossel | G02B 6/0051 |
| 2020/0241189 A1 * | 7/2020 | Schabacker | B60Q 3/208 |

FOREIGN PATENT DOCUMENTS

| | | |
|---|---|---|
| DE | 102012023135 A1 | 5/2014 |
| DE | 102014105065 A1 | 10/2015 |
| DE | 202015106328 U1 | 11/2016 |
| DE | 202015106546 U1 | 12/2016 |
| DE | 202016104100 U1 | 8/2017 |

* cited by examiner

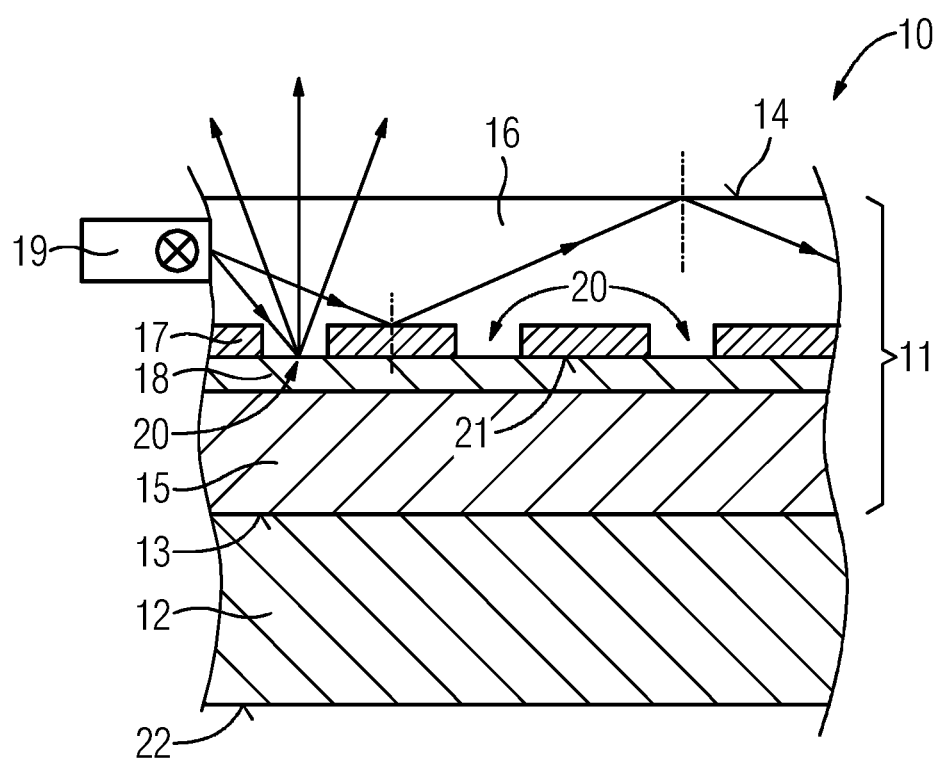

MOLDED PART FOR A VEHICLE INTERIOR AND METHOD FOR PRODUCING SUCH A MOULDED PART

CROSS-REFERENCE TO RELATED APPLICATIONS

The present invention is a 35 U.S.C. § 371 U.S. National Stage of PCT Application No. PCT/EP18/75806, filed on Sep. 24, 2018, which claims priority to German Patent Application No. 10 2017 122 429.7, filed Sep. 27, 2017. The entire content of each of the aforementioned patent applications is incorporated herein by reference.

BACKGROUND OF THE INVENTION

1. Field of the Invention

The invention relates to a molded part, in particular a trim part and/or lining part designed as a molded part for a vehicle interior, and to a method for producing such a molded part.

2. The Relevant Technology

DE 20 2015 106 546 U1 discloses a trim part and/or lining part designed as a molded part for a vehicle interior, comprising a decorative layer with a transparent varnish layer and a decorative layer provided on the reverse side of the varnish layer, for example a wood, in particular a wood veneer, and/or a film and/or a fabric and/or a metal and/or a composite material, in particular carbon. A carrier is in turn arranged on the reverse side of the decorative layer. Furthermore, a light source is provided for illuminating and/or lighting up the varnish layer, wherein light emanating from the light source is coupled laterally into the varnish layer.

A disadvantage of such molded parts is that the light is at least partially absorbed at the decorative layer during further transport in the varnish layer, and is therefore attenuated. There may also be undesirable light scattering at the decorative layer. Uniform light distribution in molded parts, especially in large molded parts, has therefore proven to be problematic. The appearance of the illuminated visible side depends on the distance from the light source and can be influenced by undesirable scattering effects at the decorative layer.

BRIEF SUMMARY OF THE INVENTION

The invention is based on the object of providing a new molded part, in particular a fully illuminated molded part, in which the appearance of the visible side is not adversely affected by other components of the molded part, for example the decorative layer. The invention is also based on the object of providing a new method for producing such a molded part.

This object is achieved with regard to the molded part by the features of claim 1 and with regard to the method for producing a molded part by the features of claim 10. Advantageous refinements and developments are specified in the respective dependent claims.

The molded part according to the invention comprises a decorative layer and a carrier arranged on the reverse side of the decorative layer, in particular a plastic carrier. The decorative layer in turn comprises a decorative ply and a light-conducting, in particular transparent, optical layer with a first refractive index. The optical layer is arranged on a front side of the decorative layer designed as a visible side.

The optical layer can be, for example, a glass optical layer.

Furthermore, at least one light source for illuminating and/or lighting up the optical layer is provided on or in the molded part. The light source is arranged in such a manner that light emanating from the light source is coupled directly and/or indirectly laterally into the optical layer.

In the molded part according to the invention, a light-conducting, in particular transparent, additional layer 17 with a second refractive index is also provided in the decorative ply between the decorative ply and the optical layer, adjoining the optical layer. The first refractive index of the optical layer is greater than the second refractive index of the additional layer.

The advantages of the invention result in particular from the difference in refractive index between the optical layer and the additional layer. This difference in refractive index causes total reflection for light rays in the optical layer at the interface with the additional layer, provided that the angle of incidence (angle to the surface normal) of the light rays at the interface exceeds a certain value, namely the critical angle of total reflection, which is a function of the difference in refractive index. A light beam does not enter the additional layer in this case. Rather, it is essentially fully reflected and thus remains in the optical layer. Below this critical angle, only a part of the radiation is reflected at the interface and remains in the optical layer, wherein the remaining part enters the additional layer.

The additional layer with its lower refractive index thus ensures that the light is not absorbed by the layers below, for example, the decorative ply (as compared to the absence of this additional layer), or at least is absorbed to a lesser extent. In this way, the laterally incident light can propagate in the optical layer significantly further or over greater distances with at least nearly-constant light intensity due to the reflection at the interfaces of the optical layer than in the case of a molded part without such an additional layer. This accordingly enables molded parts with large-area visible sides, which can be illuminated essentially evenly by light arriving laterally.

A further development of the invention provides that light-scattering defects are provided between the optical layer and the additional layer or in the additional layer. These are preferably designed in such a manner that light emanating from the light source is at least partially scattered in such a way that this light is coupled out of the optical layer on the front side of the decorative layer designed as a visible side. In this way, for example, illuminated symbols can be displayed on the visible side.

The defects can be designed as penetrating recesses in the additional layer. "Penetrating" in this case means an extension over the entire thickness of the additional layer. In other words: The recess is a hole through the additional layer. The recesses are intended for the passage of light from the optical layer to the decorative ply and vice versa.

The recesses in the additional layer can, for example, be filled with the material of the optical layer.

The additional layer can, for example, be or comprise a printing layer or a film or a varnish layer.

A light-scattering and/or light-absorbing intermediate layer can be provided on the reverse side of the additional layer. The intermediate layer can be designed, for example, as a printing layer and/or as a paint layer.

The defects can be arranged and/or designed, in particular shaped, in such a way that their arrangement and/or shape corresponds to a symbol to be displayed on the front side of the decorative layer, designed as a visible side.

The light source can be provided, in particular attached, on the side of the optical layer. However, it is also possible for at least one light guide to be provided, one end of which ends at the side of the optical layer and the other end of which ends at the light source, the light source preferably being provided, in particular being attached, on the reverse side of the carrier.

The decorative ply can be or comprise a, preferably opaque, wood veneer or a, preferably opaque, film.

The optical layer can have PUR and/or PMMA and/or PC or be formed from PUR and/or PMMA and/or PC.

The method according to the invention for producing a molded part comprises the steps of:
  providing a material intended for forming the decorative ply of the decorative layer of the molded part, in particular of a wood veneer or a foil,
  applying the additional layer to the front side of the decorative ply,
  Providing at least one defect in the reflection layer by introducing a recess, preferably by laser ablation, in the additional layer,
  applying, in particular pouring, the optical layer onto the additional layer,
  back-injection of the material provided for forming the decorative layer by means of injection molding with a carrier material, in particular a plastic, to form the carrier,
  providing at least one light source on or in the molded part.

By way of example, the molded parts according to the invention as described above can be produced with this method.

In addition, it can be provided that a light-scattering and/or light-absorbing intermediate layer is applied to, in particular printed onto, the front side of the decorative ply before the additional layer is applied to the front side of the decorative ply and/or the intermediate layer.

The defects can be arranged and/or shaped in such a way that they correspond to a symbol to be displayed on the front side of the decorative layer which is designed as a visible side.

The light source can be provided on the side of the optical layer, in particular it can be attached.

Alternatively, at least one light guide can be provided, in particular attached, one end of which ends at the side of the optical layer and the other end of which ends at the light source, the light source preferably being provided, in particular attached, on the reverse side of the carrier.

BRIEF DESCRIPTION OF THE DRAWINGS

The invention is explained in more detail below also with regard to further features and advantages on the basis of the description of exemplary embodiments and with reference to the accompanying schematic drawing, in which FIG. 1 shows a section of a schematic cross-sectional representation of a first embodiment of a molded part according to the invention.

Corresponding parts and components are each identified by the same reference numerals.

DETAILED DESCRIPTION OF THE PREFERRED EMBODIMENTS

The figure shows a trim part or lining part designed as a molded part 10 for a vehicle interior, comprising a decorative layer 11 and a carrier 12, for example a plastic carrier, on a reverse side 13 of the decorative layer 11.

The decorative layer 11 comprises both a decorative ply 15 and a transparent optical layer 16, for example a glass optical layer, on a front side 14 of the decorative layer 11 designed as a visible side.

A light source 19 for illuminating and/or lighting up the optical layer 16 is fixed to or in the molded part 10 on the side of the optical layer 16, wherein light emanating from the light source 19 is coupled laterally into the optical layer 16.

A transparent additional layer 17 is arranged in the decorative layer between the decorative ply 15 and the optical layer 16.

The transparent optical layer 16 has a first refractive index, and the additional layer 17 has a second refractive index, the first refractive index being greater than the second refractive index. This enables total reflection of the light emanating from the light source 19 and coupled into the optical layer 16 at the interface with the additional layer 17, provided that the angle of incidence (angle to the surface normal) of the light beams at the interface exceeds a certain value, specifically the critical angle of the total reflection according to the refractive index difference. The totally reflected light then remains in the optical layer 16 and is transported in the same essentially without loss.

The additional layer 17 has defects 20 formed as penetrating recesses, on which light emanating from the light source 19 is scattered and, inter alia, is coupled out of the optical layer 16 on the front side 14 of the decorative layer 11 designed as a visible side. In addition, the light is guided through the recesses 20 and scattered at a light-scattering intermediate layer 18, which is provided on the reverse side 21 of the additional layer 17, adjoining the recesses 20 inter alia. In this way, for example, luminous symbols can be displayed. Alternatively, the intermediate layer 18 can also be omitted, and the scattering can then take place in the decorative ply 15.

The arrows in the optical layer 16 schematically show how the light, on the one hand, is guided by total reflection at the interface to the additional layer 17 through the optical layer 16 and, on the other hand, is scattered into the defects 20 and is thus coupled out of the optical layer 16.

The additional layer 17 may be a printing layer, the decorative ply 15, an opaque wood veneer, and the optical layer 16 may be formed from PUR. The intermediate layer 18 can be designed as a printing layer.

The defects 20 are arranged in such a manner that, in their entirety, they correspond to a symbol to be displayed on the front side 14 of the decorative layer 11 which is designed as a visible side.

LIST OF REFERENCES

10 molded part
11 decorative layer
12 carrier
13 reverse side of the decorative layer 11
14 front side of the decorative layer 11
15 decorative ply
16 optical layer
17 additional layer
18 intermediate layer
19 light source
20 defect
21 reverse side of the additional layer 17
22 reverse side of the carrier 12

I claim:

1. A molded part comprising:
   a decorative layer and a carrier arranged on a reverse side of the decorative layer, wherein:
   the decorative layer comprises a decorative ply and a light-conducting optical layer with a first refractive index;
   the optical layer is arranged on a front side of the decorative layer designed as a visible side;
   at least one light source is provided on or in the molded part for illuminating or lighting up the optical layer;
   the light source is arranged in such a manner that light emanating from the light source is laterally coupled directly or indirectly into the optical layer;
   a light-conducting additional layer with a second refractive index is provided in the decorative layer between the decorative ply and the optical layer, adjacent to the optical layer; and
   the first refractive index of the optical layer is greater than the second refractive index of the additional layer.

2. The molded part according to claim 1, wherein a plurality of light-scattering defects is provided:
   between the optical layer and the additional layer, or
   in the additional layer.

3. The molded part according to claim 2, wherein the plurality of defects is designed as penetrating recesses in the additional layer.

4. The molded part according to claim 3, wherein the recesses are filled by the material of the optical layer.

5. The molded part according to claim 1, wherein the additional layer is or comprises a printing layer or a film or a varnish layer.

6. The molded part according to claim 1, wherein a light-scattering or light-absorbing intermediate layer is provided on a reverse side of the additional layer.

7. The molded part according to claim 2, wherein the plurality of defects is arranged or designed in such a manner that their arrangement or shape corresponds to a symbol to be displayed on the front side of the decorative layer which is designed as a visible side.

8. The molded part according to claim 1, wherein:
   the light source is provided on a side of the optical layer; or
   at least one light guide is provided, one end of which ends at the side of the optical layer and another end of which ends at the light source.

9. The molded part according to claim 1, wherein:
   the decorative ply is or comprises a wood veneer or a film; or
   the optical layer has PUR or PMMA or PC or is formed from PUR or PMMA or PC.

10. A method for producing the molded part as recited in claim 3, comprising the steps of:
    providing a material intended for forming the decorative ply of the decorative layer of the molded part;
    applying the additional layer to the front side of the decorative ply;
    providing at least one defect in the reflection layer by introducing a recess into the additional layer;
    applying the optical layer to the additional layer;
    back-injection of the material provided to form the decorative layer by means of injection molding with a carrier material to form the carrier; and
    providing at least one light source on or in the molded part.

11. The method according to claim 10, wherein:
    a light-scattering or light-absorbing intermediate layer is applied to the front side of the decorative ply before the additional layer is applied to the front side of the decorative ply or the intermediate layer.

12. The method according to claim 10, wherein:
    the defects are arranged or shaped in such a manner that they correspond to a symbol to be displayed on the front side of the decorative layer which is designed as a visible side.

13. The method according to claim 10, wherein:
    the light source is provided on the side of the optical layer; or
    at least one light guide is provided, one end of which ends at the side of the optical layer and the other end of which ends at the light source.

* * * * *